(12) United States Patent
Byun

(10) Patent No.: US 11,055,009 B2
(45) Date of Patent: Jul. 6, 2021

(54) DATA PROCESSING SYSTEM AND OPERATING METHOD THEREOF

(71) Applicant: SK hynix Inc., Icheon (KR)

(72) Inventor: Eu-Joon Byun, Yongin (KR)

(73) Assignee: SK hynix Inc., Icheon (KR)

( * ) Notice: Subject to any disclaimer, the term of this patent is extended or adjusted under 35 U.S.C. 154(b) by 75 days.

(21) Appl. No.: 16/535,667

(22) Filed: Aug. 8, 2019

(65) Prior Publication Data

US 2020/0174690 A1 Jun. 4, 2020

(30) Foreign Application Priority Data

Nov. 29, 2018 (KR) .......... 10-2018-0150798

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,898,410 | B1* | 11/2014 | Ehrenberg | G06F 12/0246 711/162 |
| 2011/0055502 | A1* | 3/2011 | Yamasaki | G01D 9/005 711/162 |
| 2013/0007352 | A1* | 1/2013 | Maislos | G06F 11/1008 711/103 |
| 2014/0365719 | A1* | 12/2014 | Kuzmin | G06F 12/0246 711/103 |
| 2015/0046634 | A1* | 2/2015 | Maeda | G06F 12/0888 711/103 |
| 2015/0106573 | A1* | 4/2015 | Yi | G06F 3/061 711/148 |
| 2016/0011790 | A1 | 1/2016 | Rostoker et al. | |
| 2017/0060448 | A1* | 3/2017 | Schnarch | G06F 3/0652 |
| 2017/0277550 | A1* | 9/2017 | Zhang | G06F 9/4484 |
| 2017/0277551 | A1* | 9/2017 | Nicholson | G06F 11/3466 |
| 2018/0307432 | A1* | 10/2018 | Battaje | G06F 3/0608 |
| 2019/0065121 | A1* | 2/2019 | Malina | G06F 3/0659 |
| 2019/0089383 | A1* | 3/2019 | Funaoka | G06F 11/1068 |
| 2019/0235762 | A1* | 8/2019 | Kaburaki | G06F 12/0864 |

FOREIGN PATENT DOCUMENTS

| | | |
|---|---|---|
| KR | 20130142103 A | 12/2013 |
| KR | 20140050941 A | 4/2014 |
| KR | 20160090953 A | 8/2016 |

* cited by examiner

*Primary Examiner* — Yaima Rigol

(57) ABSTRACT

Provided is a method for performing a background operation in a data processing system, including: selecting a sacrificial memory block from a plurality of memory blocks provided in a memory device; and transferring current valid data stored in the selected sacrificial memory block to a first memory in a host when an available capacity of the first memory is larger than or equal to a size of the current valid data.

17 Claims, 14 Drawing Sheets

DATA PROCESSING SYSTEM AND OPERATING METHOD THEREOF

CROSS-REFERENCE TO RELATED APPLICATION

This application claims priority under 35 U.S.C. § 119 to Korean Patent Application No. 10-2018-0150798 filed on Nov. 29, 2018, which is incorporated herein by reference in its entirety.

BACKGROUND

1. Field

Exemplary embodiments relate to a data processing system and an operating method thereof, and more particularly, to a data processing system capable of improving data processing efficiency, and an operating method thereof.

2. Discussion of the Related Art

The computer environment paradigm has shifted to ubiquitous computing, which enables computing systems to be used anytime and anywhere. As a result, use of portable electronic devices such as mobile phones, digital cameras, and laptop computers has rapidly increased. These portable electronic devices each use a memory system having one or more memory devices for storing data. A memory system may be used as a main memory system or an auxiliary memory system of a portable electronic device.

Such Memory systems provide excellent stability, durability, high information access speed, and low power consumption since they have no mechanical driving parts, as compared with a hard disk device. Examples of memory systems having such advantages include universal serial bus (USB) memory devices, memory cards having various interfaces, solid state drives (SSDs), and the like.

SUMMARY

Various embodiments are directed to a data processing system capable of efficiently processing data in a background operation using an integrated memory of a host, and an operating method of the data processing system.

In accordance with an embodiment of the present invention, a method for performing a background operation in a data processing system, the method includes: selecting a sacrificial memory block from a plurality of memory blocks provided in a memory device; and transferring current valid data stored in the selected sacrificial memory block to a first memory in a host when an available capacity of the first memory is larger than or equal to a size of the current valid data.

In accordance with another embodiment of the present invention, a data processing system includes: a host including a first memory; and a memory system including a memory device and a controller, wherein, in order to perform a background operation, the memory system is configured to: select a sacrificial memory block from a plurality of memory blocks provided in the memory device; and transfer current valid data stored in the selected sacrificial memory block to the first memory in the host when an available capacity of the first memory is larger than or equal to a size of the current valid data.

In accordance with another embodiment of the present invention, a memory system, includes: a memory device including a sacrificial memory block and at least one target memory block; and a controller coupled to the memory device and having a first memory, the controller configured to load current valid data stored in the sacrificial memory block in the first memory, and transfer the current valid data to a host when the available capacity of a second memory of the host is larger than or equal to a size of the current valid data.

In accordance with another embodiment of the present invention, a data processing system includes: a host including an integrated memory; and a memory system configured to select at least one sacrificial memory block from a plurality of memory blocks, read sacrificial data stored in the sacrificial memory block, compare an available capacity of the at least one integrated memory with a size of the sacrificial data, and provide the sacrificial data to the host when the available capacity of the integrated memory is larger than or equal to the size of the sacrificial data, when a background operation is performed, wherein the host stores the sacrificial data in the integrated memory, and wherein the sacrificial data is valid data stored in the sacrificial memory block.

In accordance with another embodiment of the present invention, a method for operating a data processing system, which includes a host including an integrated memory and a memory system including a controller and a memory device, includes: selecting a sacrificial memory block from a plurality of memory blocks included in the memory device; loading sacrificial data stored in the sacrificial memory block from the memory device to a memory included in the controller; comparing an available capacity of the integrated memory with a size of the sacrificial data; and storing the sacrificial data in the integrated memory when the available capacity of the integrated memory is larger than or equal to the size of the sacrificial data, wherein the sacrificial data is valid data stored in the sacrificial memory block.

DETAILED DESCRIPTION

Figure 1:
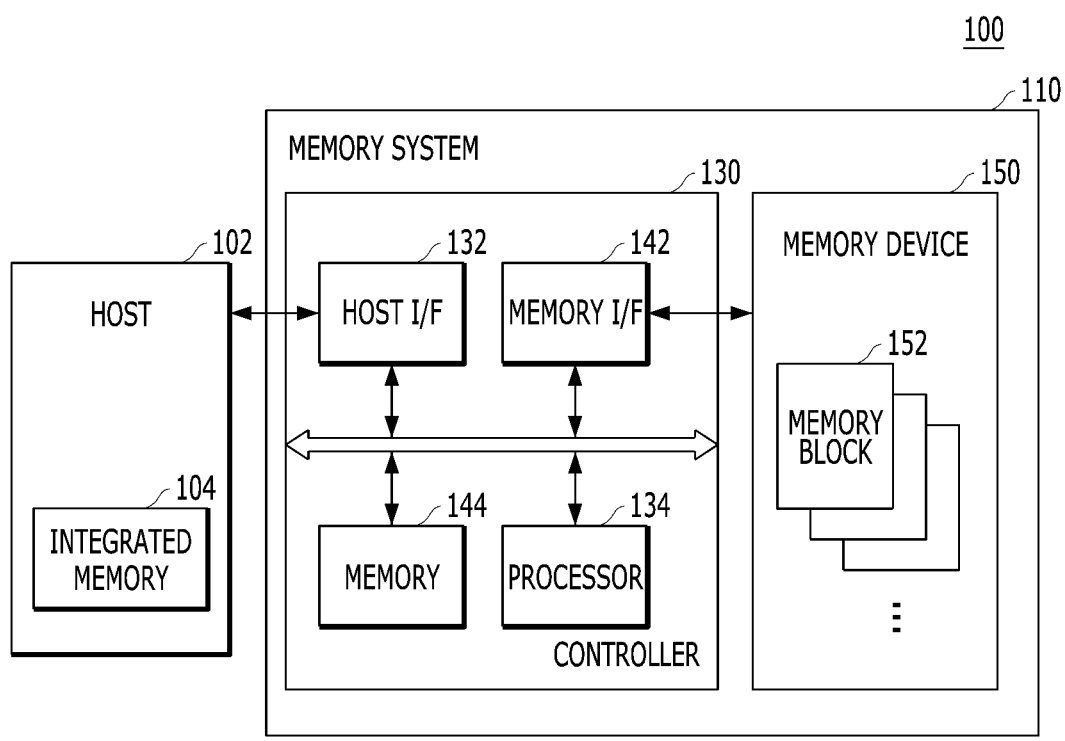
FIG. 1 is a block diagram illustrating a data processing system including a memory system in accordance with an embodiment of the present disclosure.

Exemplary embodiments of the present disclosure will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms, "comprise," "include," "have," etc. when used in this specification, specify the presence of stated features, numbers, steps, operations, elements, components, and/or combinations thereof but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, various embodiments of the present disclosure will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of portable electronic devices, such as a mobile phone, a MP3 player, a laptop computer, and the like, or any of non-portable electronic devices, such as a desktop computer, a game machine, a TV, a projector, and the like.

The host 102 may include at least one operating system (OS) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform a plurality of operations corresponding to the plurality of commands, that is, corresponding to the user's request. The OS may manage and control overall functions and operations of the host 102. The OS may support an operation between the host 102 and a user using the data processing system 100 or the memory system 110.

In addition, the host 102 may include an integrated memory 104 capable of storing data required for performing an operation with an operating system or the memory system 110. For example, the host 102 may store data provided from the memory system 110 in the integrated memory 104. Furthermore, the host 102 may provide the memory system 110 with information on available capacity of the integrated memory 104. On the basis of the available capacity of the integrated memory 104, the host 102 may perform data communication with the memory system 110. In an embodiment, the integrated memory 104 may be a unified memory (UM) provided in the host 102 that includes at least part of a random access memory (RAM) in the host 102. The memory system 110 can use the UM based on a flash storage specification for electronic devices, such as Universal Flash Storage (UFS).

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with one or more of various types of storage devices, which may be electrically coupled with the host 102, according to a protocol of a host interface. The memory system 110 may include a solid state drive (SSD), a multi-media card (MMC), an embedded MMC (eMMC), or the like.

The various types of storage devices may include volatile memory devices, such as a DRAM dynamic random access memory (DRAM), a static RAM (SRAM), and the like, and nonvolatile memory devices, such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), a flash memory, and the like.

The memory system 110 may include a memory device 150 and a controller 130.

In an embodiment, the controller 130 and the memory device 150 may be integrated into a single semiconductor device, which may be included in any of the memory systems described above. For example, the controller 130 and the memory device 150 may be integrated as a single semiconductor device to constitute any of an SSD, an MMC, an eMMC, a Personal Computer Memory Card International Association (PCMCIA) card, a secure digital (SD) card, a mini-SD card, a micro-SD card, a secure digital high capacity (SDHC) card, a universal flash storage (UFS) device, and the like. The memory system 110 may be configured as a part of a computer, a smart phone, a portable game player, or any of various components configuring a computing system.

In the memory system 110, the memory device 150 may retain data stored therein although power is not supplied thereto. In particular, the memory device 150 stores data received from the host 102 by performing a program or write operation and provides the host 102 with data stored therein by performing a read operation.

As illustrated in FIG. 1, the memory device 150 may include a plurality of memory blocks 152. Each of the memory blocks 152 may include a plurality of pages, and each of the pages may include a plurality of memory cells to which a corresponding one of a plurality of word lines WL is coupled. Therefore, the number of the plurality of pages may correspond to the number of the plurality of word lines WL.

In an embodiment, the memory device 150 may include a plurality of memory dies (not shown), and each memory die may include a plurality of planes (not shown). In an embodiment, the memory device 150 may be a flash memory having a three-dimensional (3D) stack structure.

The above structures of the memory device 150 will be described later with reference to FIGS. 2 to 4.

The controller 130 may control the memory device 150 in response to a request from the host 102. For example, the controller 130 may provide data read from the memory device 150 to the host 102 in response to a read request, and store data from the host 102 into the memory device 150 in response to a write request. For these operations, the controller 130 may control read, write, program, and erase operations of the memory device 150.

More specifically, the controller 130 may include a host interface (I/F) 132, a processor 134, a memory interface (I/F) 142, and a memory 144, all operatively coupled or engaged to each other via an internal bus.

The host interface 132 may physically and electrically connect the controller 130 to the host 102. Thus, the controller 130 may receive a command and data supplied by the host 102 through the host interface 132, and may output data from the memory device 150 to the host 102 through the host interface 132. That is, the controller 130 may communicate with the host 102 through the host interface 132. The host interface 132 may communicate with the host 102 using one or more of various interface protocols such as universal serial bus (USB), a multi-media card (MMC), a peripheral component interconnect-express (PCI-E), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), and the like. The host interface 132 may be driven by a firmware, that is, a host interface layer (HIL), to exchange data with the host 102.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130.

The memory 144 may be implemented with a volatile memory device. For example, the memory 144 may include a static random access memory (SRAM) or dynamic random access memory (DRAM). The memory 144 may be disposed within or external to the controller 130. FIG. 1 shows the memory 144 disposed within the controller 130. In another embodiment, the memory 144 may be an external volatile memory device that is disposed outside the controller 130 and has a memory interface for transferring data between the memory 144 and the controller 130.

The memory 144 may include one or more of a program memory, a data memory, a write buffer/cache, a read buffer/cache, a data buffer/cache, and a map buffer/cache in order to store data required for performing data write and read operations between the host 102 and the memory device 150 and other data required for the controller 130 and the memory device 150 to perform these operations.

The processor 134 may control overall operations of the memory system 110. The processor 134 may use firmware to control the overall operations of the memory system 110. The firmware may be referred to as a flash translation layer (FTL). The processor 134 may be implemented with a microprocessor or a central processing unit (CPU).

For example, the controller 130 may perform an operation requested by the host 102 in the memory device 150 using the processor 134. Also, the controller 130 may perform a background operation on the memory device 150 using the processor 134. The background operation performed on the memory device 150 may include any of a garbage collection (GC) operation, a wear-leveling (WL) operation, a map flush operation, a bad block management operation, and so on. With reference to FIG. 5A and FIG. 5B, the garbage collection operation for the memory device 150 will be described in detail.

Although not illustrated in the drawings, the controller 130 may further include an error correction code (ECC) unit and a power management unit (PMU).

The ECC unit may correct an error bit of data processed by the memory device 150, and include an ECC encoder and an ECC decoder.

The ECC encoder may generate data having a parity bit by performing error correction encoding on data to be programmed to the memory device 150, and the data having the parity bit may be stored in the memory device 150. When data stored in the memory device 150 is read, the ECC decoder detects and corrects an error included in the data read from the memory device 150.

The ECC unit may perform error correction using coded modulation such as a low density parity check (LDPC) code, a Bose-Chaudhuri-Hocquenghem (BCH) code, a Hamming code, a turbo code, a Reed-Solomon code, a convolution code, a recursive systematic code (RSC), a trellis-coded modulation (TCM), a block coded modulation (BCM), or the like. The ECC unit may include all circuits, modules, systems, or devices for error correction.

The PMU may provide and manage power of the controller 130, that is, power of the components included in the controller 130.

Hereinafter, with reference to FIG. 2 to FIG. 4, the memory device 150 in the memory system 110 in accordance with embodiments will be described in more detail.

Figure 2:
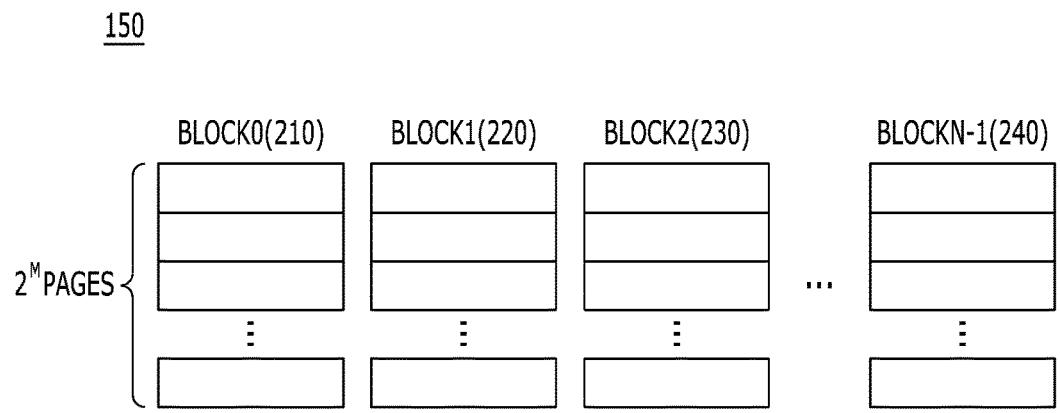
FIG. 2 is a schematic diagram illustrating a memory device employed in the memory system shown in FIG. 1.

FIG. 2 is a schematic diagram illustrating the memory device 150 shown in FIG. 1 in accordance with an embodiment. FIG. 3 is a circuit diagram illustrating a memory cell array of a memory block 330 in the memory device 150 in accordance with an embodiment. FIG. 4 is a schematic diagram illustrating an exemplary 3D structure of the memory device 150 in accordance with an embodiment.

Referring to FIG. 2, the memory device 150 may include a plurality of memory blocks BLOCK0 to BLOCKN−1, where N is an integer greater than 1. Each of the memory blocks BLOCK0 to BLOCKN−1 may include a plurality of pages, for example, $2^M$ or M numbers of pages, and the number of the plurality of pages may vary according to circuit design, M being an integer greater than 1. Each of the pages may include a plurality of memory cells that are coupled to a corresponding one of a plurality of word lines WL.

Also, each of memory cells in the memory blocks BLOCK0 to BLOCKN−1 may be a single-level cell (SLC) storing 1-bit data or a multi-level cell (MLC) storing multi-bit data, e.g., 2 or more bit data. Hence, the memory device 150 may include SLC memory blocks or MLC memory blocks, depending on the number of bits which can be stored in each of the memory cells in the memory blocks BLOCK0 to BLOCKN−1. The SLC memory block may include a plurality of pages each including memory cells, each memory cell storing one-bit data. The SLC memory block may generally have higher data computing performance and higher durability than the MLC memory block. The MLC memory block may include a plurality of pages each including memory cells, each memory cell storing multi-bit data (e.g., 2 or more bit data). The MLC memory block may generally have larger data storage space, that is, higher integration density, than the SLC memory block.

In another embodiment, the memory device 150 may include a plurality of triple-level cell (TLC) memory blocks. In yet another embodiment, the memory device 150 may include a plurality of quadruple-level cell (QLC) memory blocks. The TCL memory block may include a plurality of pages including memory cells each capable of storing 3-bit data. The QLC memory block may include a plurality of pages including memory cells each capable of storing 4-bit data.

The memory device 150 may be implemented by one or more of a phase change random access memory (PCRAM), a resistive random access memory (ReRAM), a ferroelectrics random access memory (FRAM), a spin transfer torque magnetic random access memory (STT-MRAM), and the like.

The memory blocks 210, 220, 230, and 240 in the memory device 150 may store therein data transferred from the host 102 by performing a program operation, and may transfer data stored therein to the host 102 by performing a read operation.

Figure 3:
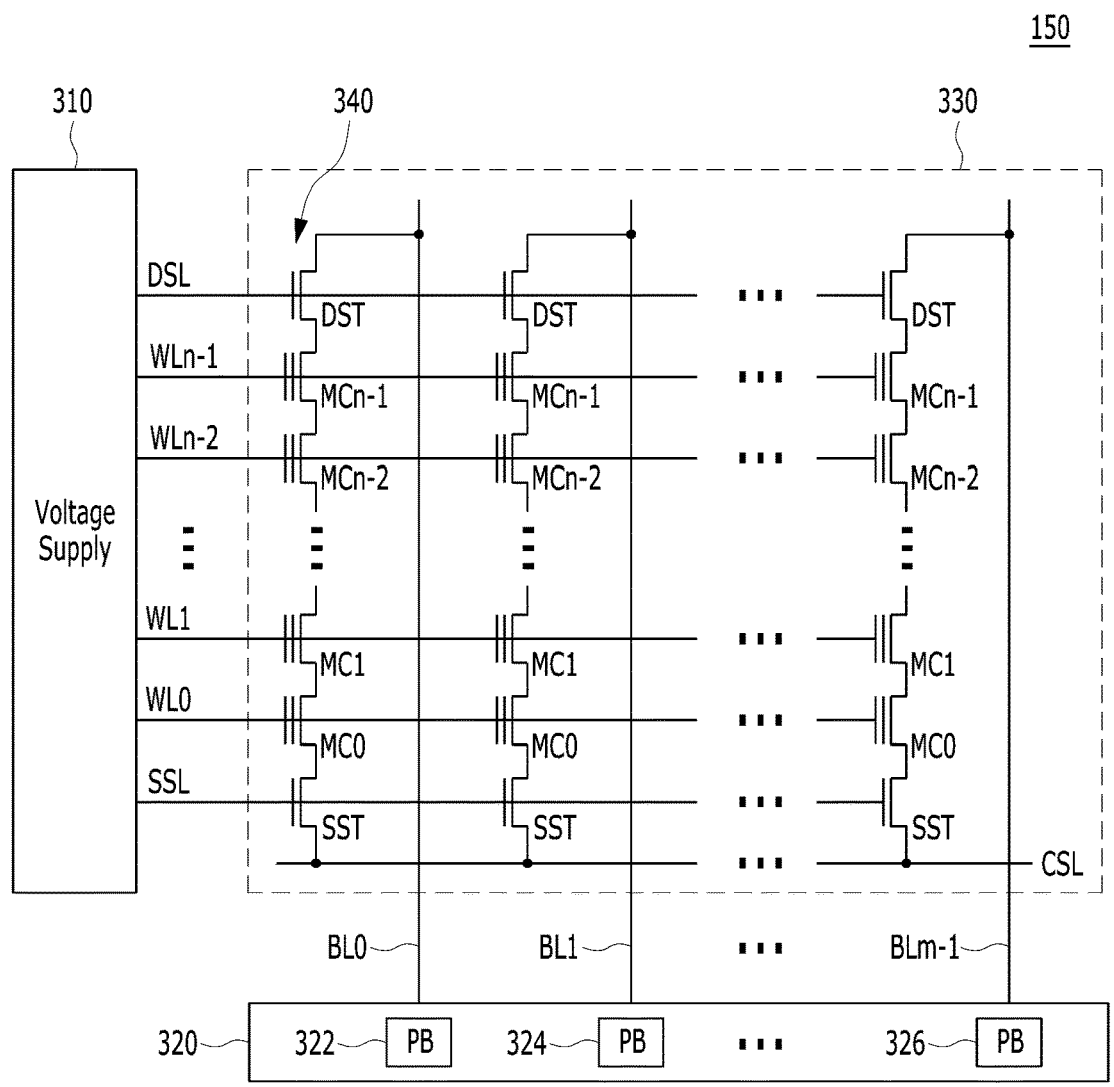
FIG. 3 is a circuit diagram illustrating a memory cell array of a memory block in the memory device shown in FIG. 1.

Next, referring to FIG. 3, a memory block 330, which corresponds to a memory block in the memory device 150 shown in FIG. 2, may include, as a memory cell array, a plurality of cell strings 340 that are coupled to a plurality of bit lines BL0 to BLm−1, respectively, m being an integer greater than 1.

The cell string 340 of each column may include one or more drain select transistors DST and one or more source select transistors SST. A plurality of memory cells MC0 to MCn−1 may be coupled in series between the drain select transistors DST and the source select transistors SST. In an embodiment, each of the memory cell transistors MC0 to MCn−1 may be an MLC capable of storing multi-bit data. The plurality of memory cells MC0 to MCn−1 may be coupled to a plurality of word lines WL0 to WLn−1, respectively, n being an integer greater than 1.

Each of the cell strings 340 may be electrically coupled to a corresponding bit line among the plurality of bit lines BL0 to BLm−1. For example, as illustrated in FIG. 3, the first cell string among the plurality of cell strings 340 is coupled to the first bit line BL0 among the plurality of bit lines BL0 to BLm−1, and the last cell string among the plurality of cell strings 340 is coupled to the last bit line BLm−1 among the plurality of bit lines BL0 to BLm−1.

FIG. 3 illustrates the memory block 330 composed of NAND flash memory cells, as an example. However, embodiments are not limited thereto. In another embodiment, the memory block 330 in the memory device 150 may be implemented with a NOR-type flash memory, a hybrid flash memory in which two or more types of memory cells are mixed, or a one-NAND flash memory having a controller embedded in a memory chip.

The memory device 150 shown in FIG. 3 may further include a voltage supply circuit 310. The voltage supply circuit 310 may provide word line voltages (for example, a program voltage, a read voltage, a pass voltage, and the like) to the plurality of word lines WL0 to WLn−1, and a bulk voltage to a bulk (for example, a well region) in which memory cells are formed, depending on operation modes. The voltage supply circuit 310 may perform a voltage generation operation under the control of a control circuit (not illustrated) of the memory device 150. Furthermore, the voltage supply circuit 310 may generate a plurality of variable read voltages in order to read a plurality of read data from the memory block 330.

When one of memory blocks (or sectors) in the memory device 150 is selected and then one of word lines of the selected memory block is selected in response to control signals of the control circuit, the voltage supply circuit 310 may provide the word line voltages to the selected word line and the unselected word lines.

The memory device 150 may further include a read/write circuit 320 which is controlled by the control circuit. During a verification/normal read operation, the read/write circuit 320 may operate as a sense amplifier for reading (sensing and amplifying) data from the memory block 330. During a program or write operation, the read/write circuit 320 may operate as a write driver for supplying a voltage or a current to bit lines according to write data to be stored in the memory block 330. During the program or write operation, the read/write circuit 320 may receive the write data from a buffer (not illustrated), and drive bit lines according to the received write data. The read/write circuit 320 may include a plurality of page buffers 322 to 326 respectively corresponding to columns (or bit lines) or pairs of columns (or pairs of bit lines). Each of the page buffers 322 to 326 may include a plurality of latches (not illustrated).

The memory device 150 may have a two-dimensional or three-dimensional structure. Particularly, as illustrated in FIG. 4, the memory device 150 may include a nonvolatile memory device having a three-dimensional stack structure. The memory device 150 shown in FIG. 4 may include a plurality of memory blocks BLK0 to BLKN−1 that are stacked in a third direction. Each of the memory blocks BLK0 to BLKN−1 may include a structure extending in first to third directions, e.g. an x-axis direction, a y-axis direction, and a z-axis direction, and thus may be implemented as a three-dimensional structure.

Figure 4:
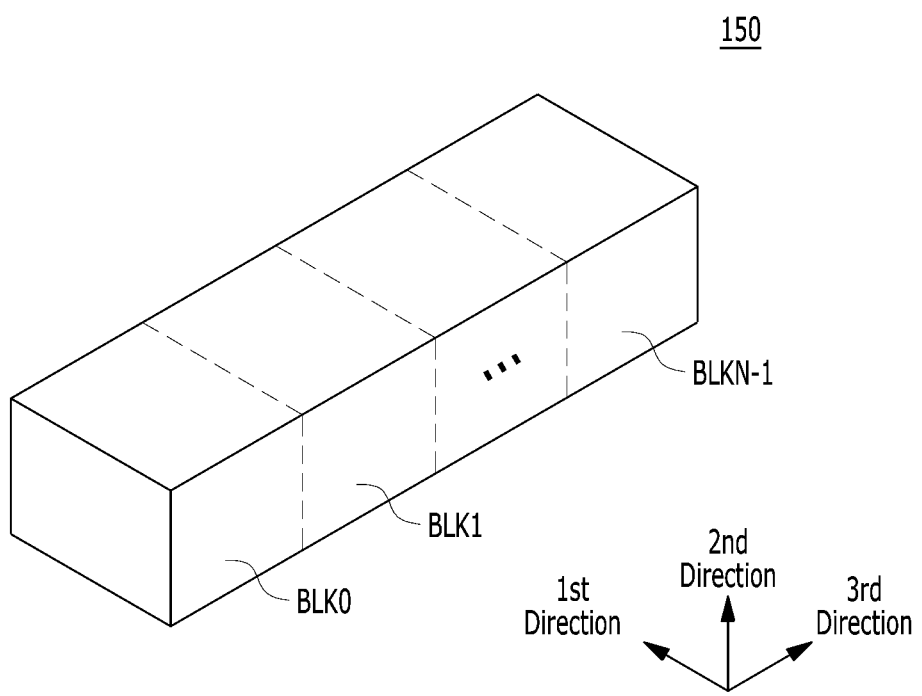
FIG. 4 is a block diagram illustrating a memory device of a memory system in accordance with an embodiment of the present disclosure.

Referring to FIGS. 3 and 4, each memory block 330 included in the memory device 150 may include a plurality of cell strings 340 each extending in the second direction, and the plurality of cell strings 340 may be arranged in the first and third directions. In an embodiment, each of the plurality of cell strings 340 may be coupled to a corresponding bit line BL of the plurality of bit lines BL0 to BLm−1, at least one string selection line SSL, at least one ground selection line GSL (not illustrated), a plurality of word lines WL0 to WLn−1, at least one dummy word line DWL (not illustrated), and a common source line CSL. In an embodiment each of the plurality of cell strings 340 may include a plurality of transistor structures TS (not illustrated). However, embodiments are not limited thereto.

In another embodiment, each memory block 330 may include a plurality of NAND strings NS that are coupled to one bit line BL, so that a plurality of transistors can be implemented in one NAND string NS. Furthermore, string select transistors SST of the respective NAND strings NS may be coupled to a corresponding bit line BL, and ground select transistors GST of the respective NAND strings NS may be coupled to a common source line CSL. Memory cells MC may be provided between the string select transistors SST and the ground select transistors GST of the respective NAND strings NS. That is, the plurality of memory cells may be implemented in each memory block 330 in the plurality of memory blocks of the memory device 150.

Figure 5:
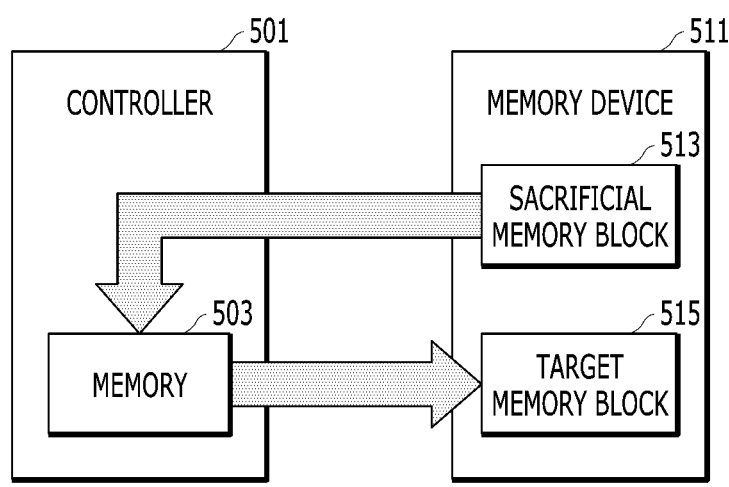
FIG. 5 is a conceptual view illustrating a garbage collection operation.

FIG. 5 is a conceptual view illustrating a garbage collection (GC) operation in a memory system that includes a controller 501 and a memory device 511.

The controller 501 may select a memory block 513 (hereinafter, referred to as a 'sacrificial memory block') from which data is erasable, among a plurality of memory blocks included in the memory device 511. In order to ensure a space for storing high-capacity data, or perform the garbage collection operation or a wear-leveling operation, the controller 501 may move valid data (hereinafter, referred to as 'sacrificial data') stored in the sacrificial memory block 513 to a target memory block 515.

Among the above operations, FIG. 5 relates to the garbage collection operation. The garbage collection operation may include a first operation of searching for an unavailable area, which is no longer available or does not need to be used in a program or write operation, from a dynamically allocated memory area in the memory device 511, a second operation of moving valid data in the searched unavailable area to an available or free area that is available in the program or write operation, and a third operation of deleting all data stored in the searched unavailable area. By performing the garbage collection operation, the unavailable area is changed to a free area. The unavailable area may correspond to the sacrificial memory block 513, and the available or free area may correspond to the target memory block 515.

Particularly, the controller 501 may select the sacrificial memory block 513 in the memory device 511 through the first operation. At this time, the controller 501 may preferentially select a memory block having the smallest number of valid data therein, among a plurality of memory blocks in the memory device 511, as the sacrificial memory block 513. In the second operation, the controller 501 may read sacrificial data from the sacrificial memory block 513, store the read sacrificial data in a memory 503 in the controller 501, and then program the sacrificial data in the target memory block 515 of the memory device 511. Then, in the third operation, the controller 501 may delete all data stored in the sacrificial memory block 513. The sacrificial memory block 513 from which all the data has been deleted may be referred to as a "free memory block." The controller 501 may store new data in the free memory block that was the sacrificial memory block 513. As described above, the free memory block may represent a memory block having no data stored therein and thus having an available space for a program or write operation.

In order to efficiently perform the garbage collection operation, the controller 501 should efficiently perform a first sub-operation of storing the valid data of the sacrificial memory block 513 in the memory 503 of the controller 501 and a second sub-operation of storing the valid data stored in the memory 503 in the target memory block 515. Particularly, in the first sub-operation, if it is possible to read a lot of valid data from a plurality of sacrificial memory blocks at a time and store the read valid data in the memory 503, the efficiency of the garbage collection operation may be increased.

However, since the memory 503 has a limited capacity, the controller 501 can use the memory 503 only within the limited capacity in the garbage collection operation.

Hereinafter, a data processing system capable of solving the aforementioned drawback using an integrated memory of a host will be described with reference to FIGS. 6A to 7C. The memory capacity that is usable in the garbage collection operation may be increased using the integrated memory of the host in addition to the memory 503 in the controller 501.

Figure 6A:
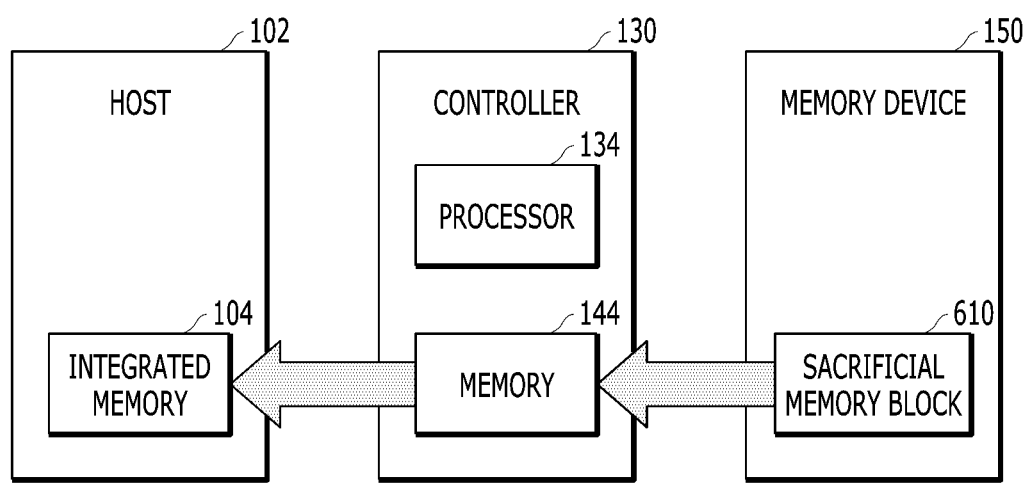
FIG. 6A is a conceptual view illustrating a garbage collection operation in accordance with an embodiment.

FIG. 6A is a conceptual view illustrating an operation of the data processing system 100 shown in FIG. 1 in accordance with an embodiment.

Firstly, the processor 134 of the controller 130 may search a plurality of memory blocks included in the memory device 150 to thereby select at least one sacrificial memory block 610 from the plurality of memory blocks. Particularly, the processor 134 may select a memory block having the smallest number of valid data among the plurality of memory blocks as the sacrificial memory block 610. Then, the processor 134 may control the memory device 150 to read valid data (hereinafter, referred to as 'sacrificial data') stored in the sacrificial memory block 610. Moreover, the processor 134 may store the read sacrificial data in the memory 144 of the controller 130.

Furthermore, the processor 134 may compare an available capacity of the integrated memory 104 with a size of the sacrificial data stored in the memory 144. On the basis of the comparison result, the processor 134 may determine whether or not to provide the host 102 with the sacrificial data stored in the memory 144. For example, when the available capacity of the integrated memory 104 is larger than or equal to the size of the sacrificial data, the processor 134 may provide the host 102 with the sacrificial data stored in the memory 144. Information on the available capacity of the integrated memory 104 may be stored in the memory 144.

Then, the host 102 may store the sacrificial data provided from the controller 130 in the integrated memory 104. After the sacrificial data is stored in the integrated memory 104, the host 102 may provide the controller 130 with updated information on the available capacity of the integrated memory 104. On the basis of the updated information on the available capacity of the integrated memory 104 provided from the host 102, the processor 134 may update the information on the available capacity of the integrated memory 104 stored in the memory 144.

Figure 6B:
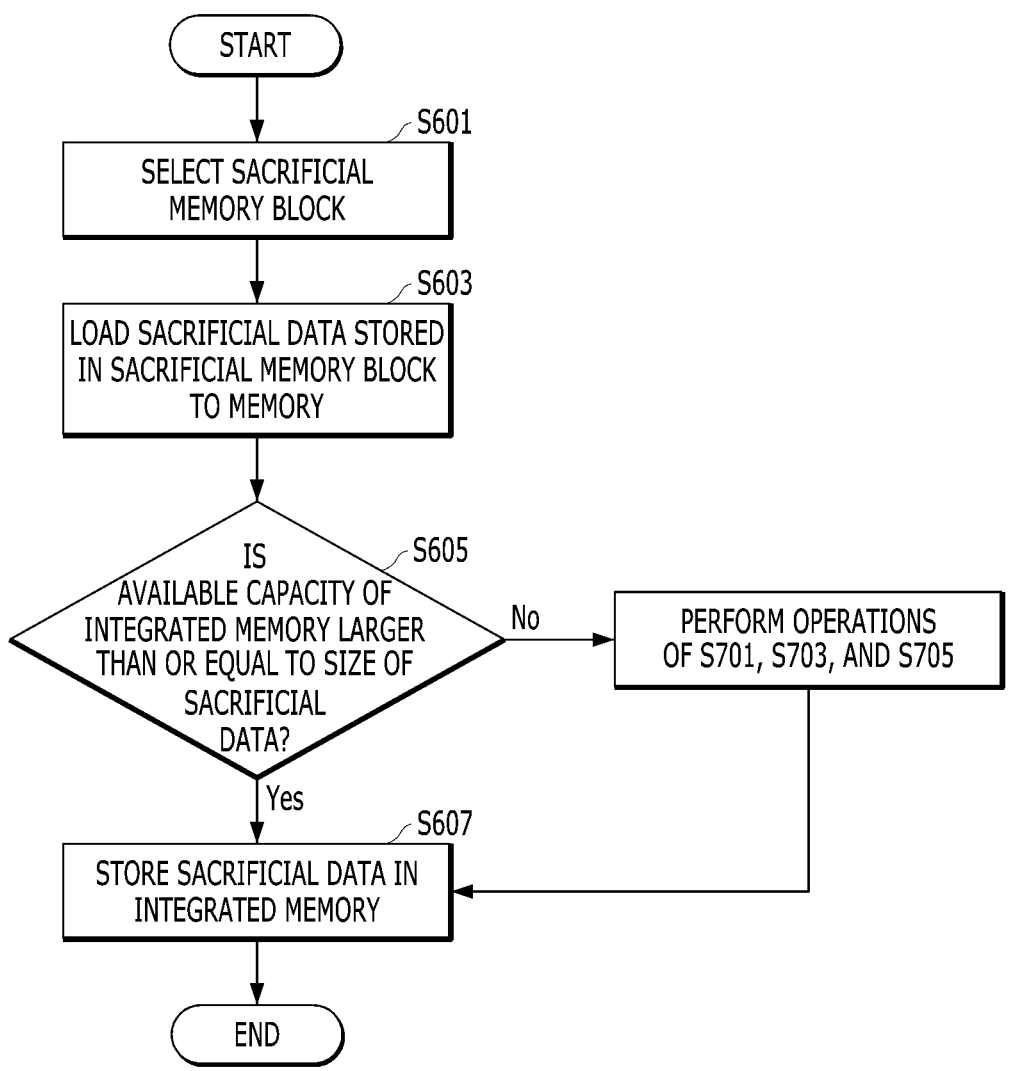
FIG. 6B is a flowchart illustrating a garbage collection operation in accordance with an embodiment.

FIG. 6B is a flowchart illustrating an operation of the data processing system 100 shown in FIG. 1 in accordance with an embodiment. Particularly, FIG. 6B illustrates the operation of the data processing system 100 described with reference to FIG. 6A.

In step S601, the processor 134 may select at least one sacrificial memory block from the plurality of memory blocks included in the memory device 150. On the basis of the number of valid data stored in each of the plurality of memory blocks, the processor 134 may select the sacrificial memory block.

In step S603, the processor 134 may load the valid data, i.e., sacrificial data, stored in the sacrificial memory block to the memory 144. Specifically, the processor 134 may control the memory device 150 to read the sacrificial data stored in the selected sacrificial memory block. Then, the processor 134 may store the read sacrificial data in the memory 144.

In step S605, the processor 134 may compare the available capacity of the integrated memory 104 with a size of the sacrificial data stored in the memory 144 so as to determine whether or not to provide the host 102 with the sacrificial data stored in the memory 144.

When the available capacity of the integrated memory 104 is larger than or equal to the size of the sacrificial data ('Yes' in step S605), the processor 134 may provide the sacrificial data to the host 102 under the control of the processor 134 in step S607. Then, the host 102 may store the sacrificial data in the integrated memory 104. After the sacrificial data stored in the memory 144 is provided to the host 102, the sacrificial data is deleted from the memory 144.

Figure 7A:
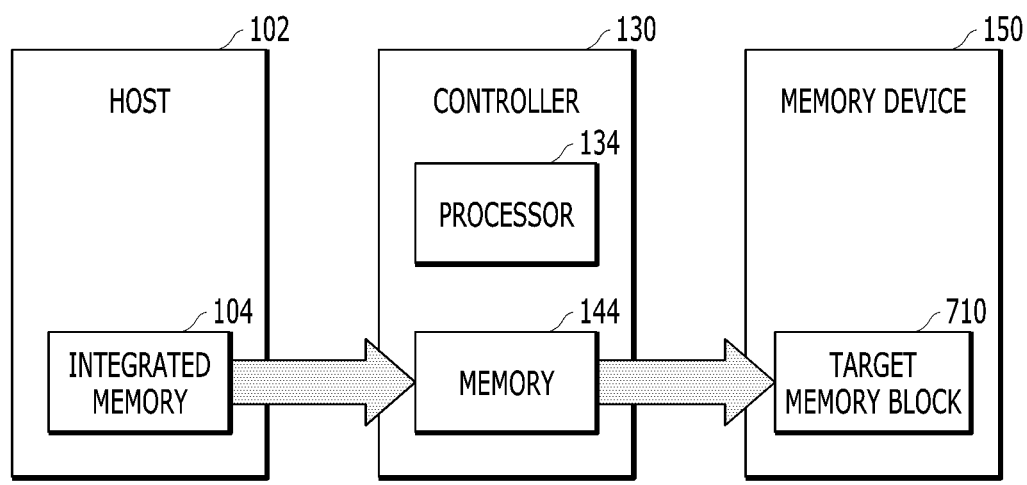
FIG. 7A is a conceptual view illustrating a garbage collection operation in accordance with an embodiment.
Figure 7B:
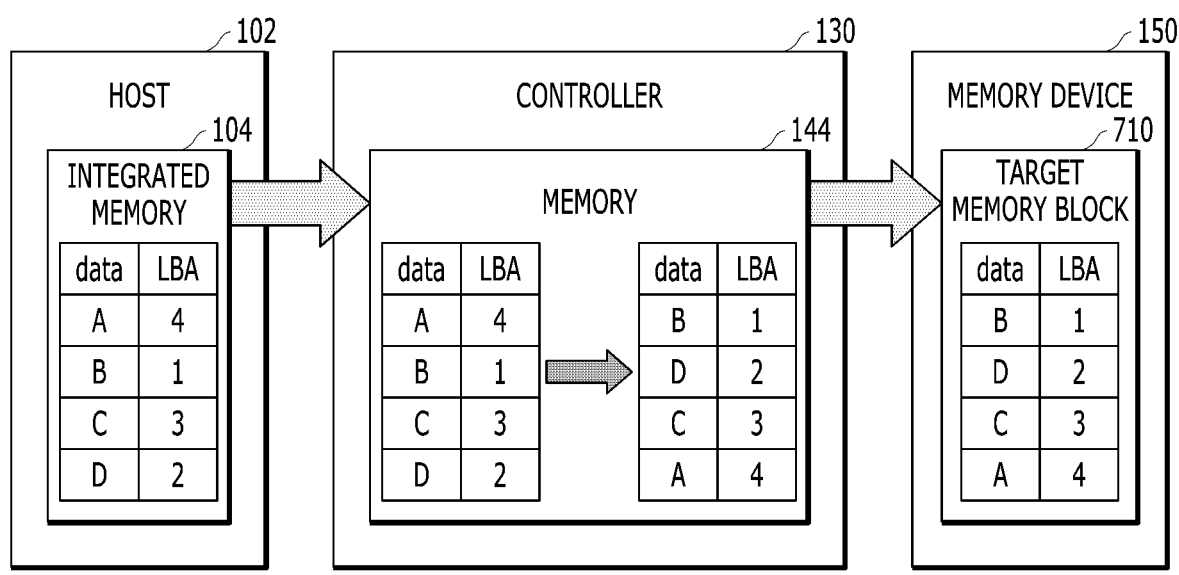
FIG. 7B is a conceptual view illustrating a garbage collection operation in accordance with an embodiment.
Figure 7C:
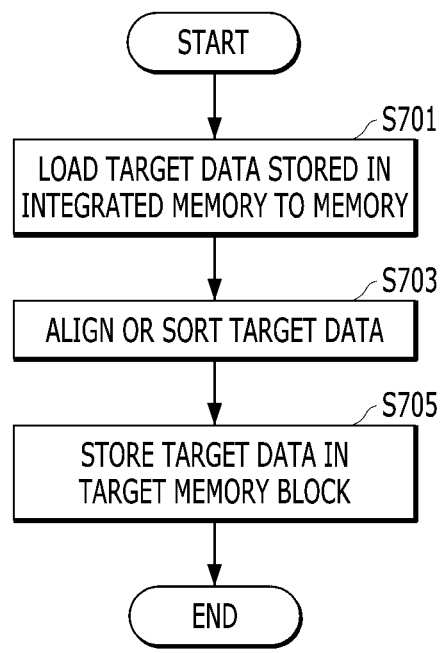
FIG. 7C is a flowchart illustrating a garbage collection operation in accordance with an embodiment.

However, when the available capacity of the integrated memory 104 is smaller than the size of the sacrificial data ('No' in step S605), operations of step S701, S703, and S705 to be described in FIG. 7C are performed and then the operation of step S607 may be performed.

FIG. 7A is a conceptual view illustrating an operation of the data processing system 100 in accordance with an embodiment. Particularly, FIG. 7A illustrates the operation of the data processing system 100 performed when the available capacity of the integrated memory 104 is determined smaller than the size of the sacrificial data stored in the memory 144 in step S605 of FIG. 6B.

As described above with reference to FIGS. 6A and 6B, the processor 134 may compare the available capacity of the integrated memory 104 with the size of the sacrificial data stored in the memory 144. When the available capacity of the integrated memory 104 is smaller than the size of the sacrificial data stored in the memory 144, the controller 130 may read out data (hereinafter, referred to as 'target data') stored in the integrated memory 104. When the sacrificial data stored in the memory 144 is current sacrificial data, the target data may correspond to previous sacrificial data that has been read from a previously searched sacrificial memory block and stored in the integrated memory 104 before the current sacrificial data is read from the memory device 150.

After the controller 130 reads out the target data, the host 102 may delete the target data stored in the integrated memory 104 regardless of what kind of operations are to be performed by the controller 130 and the memory device 150. Although not illustrated in the drawing, after the host 102 deletes the target data stored in the integrated memory 104, the processor 134 may provide the host 102 with the current sacrificial data that is stored in the memory 144. Then, the host 102 may store the provided current sacrificial data in the integrated memory 104 when the current sacrificial data is provided thereto. After that, the host 102 may provide the controller 130 with updated information on the available capacity of the integrated memory 104, such that the processor 134 may update the information on the available capacity of the integrated memory 104 stored in the memory 144.

The controller 130 may store the target data read out from the host 102 in the memory 144 under the control of the processor 134. Then, the processor 134 may arrange or sort the target data stored in the memory 144 according to a predetermined criterion.

In accordance with an embodiment, the processor 134 may arrange the target data on the basis of a logical address corresponding to the target data. For example, the processor 134 may arrange the target data in the order of the logical address corresponding to the target data.

In accordance with another embodiment, the processor 134 may sort the target data according to whether the target data is hot data or cold data. For example, the processor 134 may sort the target data as the hot data or the cold data on the basis of the number of accesses per unit time to the logical address corresponding to the target data in a read operation. When the number of accesses per unit time to a logical address corresponding to first target data is larger than or equal to a predetermined threshold value, the processor 134 may sort the first target data as the hot data. On the other hand, when the number of accesses per unit time to a logical address corresponding to second target data is smaller than the predetermined threshold value, the processor 134 may sort the second target data as the cold data. However, this is merely an example and embodiments are not limited thereto.

After completing the arrangement or the sorting of the target data, the processor 134 may control the memory device 150 to store the target data in at least one target memory block 710. The target memory block 710 may be a free memory block among the plurality of memory blocks included in the memory device 150.

For example, the processor 134 may store the target data in the target memory block 710 according to the order of the target data arranged in the memory 144.

In another embodiment, the processor 134 may store the first target data, which has been sorted as the hot data, in a first target memory block. On the other hand, the processor 134 may store the second target data, which has been sorted as the cold data, in a second target memory block. That is, the target data sorted as the hot data and the cold data may be stored in different target memory blocks.

By arranging the target data and storing the arranged target data in at least one target memory block, it is possible to increase data management efficiency in the memory device 150. FIG. 7B is a conceptual view illustrating an operation of the data processing system 100 shown in FIG. 1 in accordance with an embodiment. Particularly, FIG. 7B illustrates a moving path of target data arranged on the basis of a corresponding logical address. At this time, it is assumed that the available capacity of the integrated memory 104 is smaller than the size of the current sacrificial data stored in the memory 144.

Referring to FIG. 7B, the integrated memory 104 stores target data A corresponding to a fourth logical address LBA 4, target data B corresponding to a first logical address LBA 1, target data C corresponding to a third logical address LBA 3, and target data D corresponding to a second logical address LBA 2. When the available capacity of the integrated memory 104 is smaller than the size of the current sacrificial data stored in the memory 144, the host 102 may provide previous sacrificial data, i.e., the target data A, the target data B, the target data C, and the target data D, to the controller 130. In addition, after all those target data are provided to the controller 130, the host 102 may delete the target data A, the target data B, the target data C, and the target data D regardless of what kind of operations are to be performed by the controller 130 and the memory device 150.

The controller 130 may store the target data A, the target data B, the target data C, and the target data D provided from the host 102 in the memory 144 under the control of the processor 134. Then, the processor 134 may arrange the target data A, the target data B, the target data C, and the target data D according to the order of the logical addresses corresponding to the target data A, the target data B, the target data C, and the target data D.

For example, the processor 134 may arrange the target data A, the target data B, the target data C, and the target data D according to the order of the first logical address LBA 1 to the fourth logical address LBA 4. Specifically, the processor 134 may arrange the target data A, B, C, and D in the order of the target data B corresponding to the first logical address LBA 1, the target data D corresponding to the second logical address LBA 2, the target data C corresponding to the third logical address LBA 3, and the target data A corresponding to the fourth logical address LBA 4.

After completing the arrangement, the processor 134 may control the memory device 150 to sequentially store the target data A, B, C, and D stored in the memory 144 in at least one target memory block 710.

FIG. 7C is a flowchart illustrating an operation of the data processing system 100 in accordance with an embodiment. Particularly, step S701, S703, and S705 illustrated in FIG. 7C indicate operations to be performed after step S605 illustrated in FIG. 6B.

In step S701, the host 102 may provide the controller 130 with the previous sacrificial data stored in the integrated memory 104 as target data. Then, the controller 130 may store the target data provided from the host 102 in the memory 144 under the control of the processor 134.

In step S703, the processor 134 may arrange or sort the target data stored in the memory 144 according to a predetermined criterion. For example, the processor 134 may arrange the target data on the basis of a logical address corresponding to the target data. In another example, the processor 134 may sort the target data according to whether the target data is hot data or cold data.

In step S705, the processor 134 may store the arranged or sorted target data in a target memory block in the memory device 150.

In an embodiment, steps S703 and S705 may be performed after the processor 134 provides the host 102 with the current sacrificial data that is stored in the memory 144. In another embodiment, the processor 134 may provide the host 102 with the current sacrificial data that is stored in the memory 144 after steps S703 and S705 are performed. However, embodiments are not limited thereto.

As described above, the valid data stored in the sacrificial memory block 610 is stored in the integrated memory 104 instead of the memory 144, so that it is possible to reduce the use of the memory 144 in the background operation. Since the capacity of the memory 144 used during the background operation is reduced, the memory system 110 can perform other operations using the memory 144. As a consequence, it is possible to improve the entire operation performance of the memory system 110.

Hereinafter, with reference to FIG. 8 to FIG. 16, a more detailed description will be provided for a data processing system and electronic devices employing the memory system 110 including the memory device 150 and the controller 130 described above with reference to FIG. 1 to FIG. 5, FIG. 6A, FIG. 6B, and FIG. 7A to FIG. 7C in accordance with the embodiments of the present disclosure.

Figure 8:
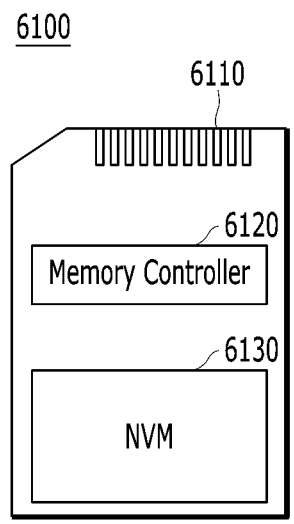
FIGS. 8 to 16 are diagrams schematically illustrating exemplary applications of the data processing system shown in FIG. 1 in accordance with various embodiments of the present disclosure.

FIG. 8 is a diagram schematically illustrating another example of the data processing system including the memory system shown in FIG. 1 in accordance with an embodiment. FIG. 8 schematically illustrates a memory card system 6100 to which the memory system shown in FIG. 1 may be applied.

Referring to FIG. 8, the memory card system 6100 may include a memory controller 6120, a memory device 6130, and a connector 6110.

More specifically, the memory controller 6120 may be electrically connected to and configured to access the memory device 6130. For example, the memory controller 6120 may be configured to control read, write, erase, and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described above with reference to FIG. 1, and the memory device 6130 may correspond to the memory device 150 of the memory system 110 described above with reference to FIG. 1.

Thus, the memory controller 6120 may include a memory, a processor, a host interface, and a memory interface, and further include an error correction unit.

The memory controller 6120 may communicate with an external device, for example, the host 102 of FIG. 1, through the connector 6110. For example, as described above with reference to FIG. 1, the memory controller 6120 may be configured to communicate with the external device through one or more of various communication protocols such as a universal serial bus (USB), a multi-media card (MMC), an embedded MMC (eMMC), a peripheral component interconnection (PCI), a PCI express (PCIe), an Advanced Technology Attachment (ATA), a Serial-ATA, a Parallel-ATA, a small computer system interface (SCSI), an enhanced small disk interface (EDSI), an Integrated Drive Electronics (IDE), a Firewire, a universal flash storage (UFS), a WIFI, a Bluetooth, and the like. Thus, the memory system and the data processing system in accordance with the present disclosure may be applied to wired/wireless electronic devices or specific mobile electronic devices.

The memory device 6130 may be implemented with a nonvolatile memory (NVM). For example, the memory device 6130 may be implemented with any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM), a spin torque transfer magnetic RAM (STT-RAM), and the like.

The memory controller 6120 and the memory device 6130 may be integrated into a single semiconductor device. The memory card system 6100 may include any of a PC card (PCMCIA: Personal Computer Memory Card International Association), a compact flash (CF) card, a smart media card (e.g., an SM and an SMC), a memory stick, a multi-media card (e.g., an MMC, an RS-MMC, an MMCmicro, or an eMMC), an SD card (e.g., an SD, a miniSD, a microSD, or an SDHC), a universal flash storage (UFS), and the like.

Figure 9:
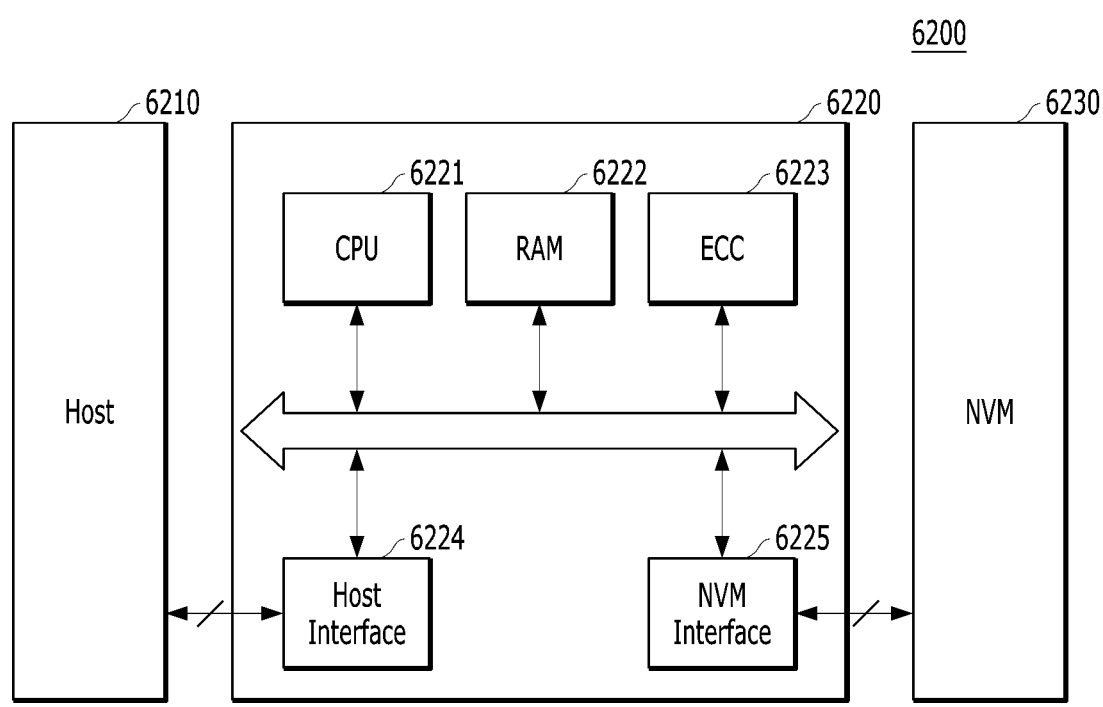

FIG. 9 is a diagram schematically illustrating another example of the data processing system including the memory system shown in FIG. 1 in accordance with an embodiment.

Referring to FIG. 9, a data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD, or the like) or a USB device, as described above with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write, or erase operation on the memory device 6230 in response to a request of a host 6210. The memory controller 6220 may include one or more CPUs 6221, a buffer memory 6222 such as a RAM, an ECC circuit 6223, a host interface 6224, and a memory interface 6225 such as an NVM interface.

The CPU 6221 may control overall operations of the memory device 6230, for example, read, write, file system management, and bad page management operations. The RAM 6222 may operate according to the control of the CPU 6221, and be used as a work memory, buffer memory, or cache memory. When the RAM 6222 is used as the work memory, data processed by the CPU 6221 may be temporarily stored in the RAM 6222. When the RAM 6222 is used as the buffer memory, the RAM 6222 may buffer data to be transmitted to the memory device 6230 from the host 6210, or data to be transmitted to the host 6210 from the memory device 6230. When the RAM 6222 is used as the cache memory, the RAM 6222 may assist the low-speed memory device 6230 to operate at high speed.

The ECC circuit 6223 may generate an ECC (Error Correction Code) for correcting a failed bit or error bit of data provided from the memory device 6230. The ECC circuit 6223 may perform error correction encoding on data to be provided to the memory device 6230, thereby generating data including a parity bit. The parity bit may be stored in the memory device 6230. The ECC circuit 6223 may perform error correction decoding on data outputted from the memory device 6230. The ECC circuit 6223 may correct an error using the parity bit during the error correction decoding. For example, the ECC circuit 6223 may correct the error using an LDPC code, BCH code, turbo code, Reed-Solomon code, convolution code, RSC, or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, a SATA bus, a SCSI, an USB, a PCIe, or a NAND interface. The memory controller 6220 may have a wireless communication function with a mobile communication protocol such as WiFi or Long Term Evolution (LTE). The memory controller 6220 may be connected to an external device, for example, the host 6210, and transmit/receive data to/from the external device. In particular, as the memory controller 6220 is configured to communicate with the external device according to one or more of various communication protocols, the memory controller 6220 may be applied to wired/wireless electronic devices, particularly to a mobile electronic device.

Figure 10:
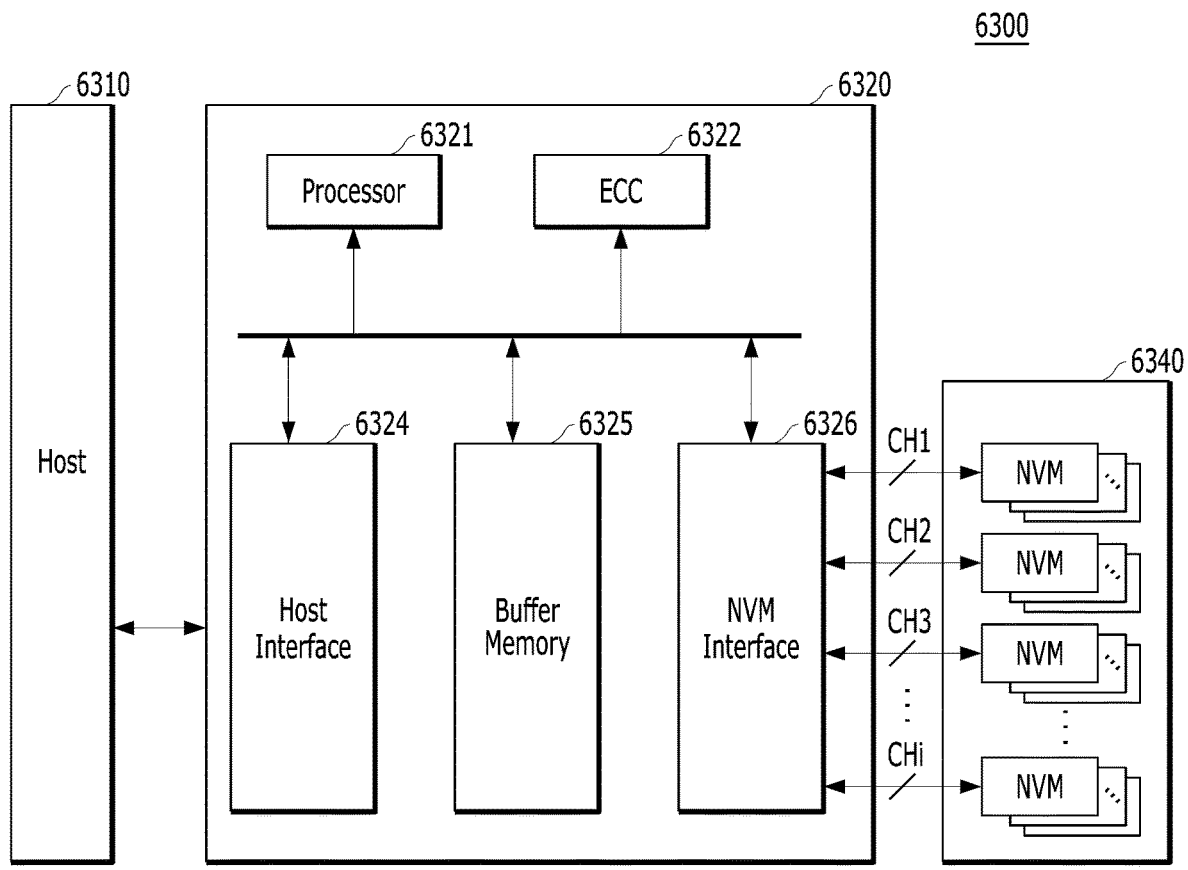

FIG. 10 is a diagram schematically illustrating another example of the data processing system including the memory system shown in FIG. 1 in accordance with an embodiment. FIG. 10 schematically illustrates an SSD 6300 to which the memory system shown in FIG. 1 may be applied.

Referring to FIG. 10, the SSD 6300 may include a controller 6320 and a memory device 6340 including a plurality of nonvolatile memories NVMs. The controller 6320 may correspond to the controller 130 in the memory system 110 of FIG. 1, and the memory device 6340 may correspond to the memory device 150 in the memory system 110 of FIG. 1.

More specifically, the controller 6320 may be connected to the memory device 6340 through a plurality of channels CH1 to CHi, i being an integer greater than 1. The controller 6320 may include one or more processors 6321, a buffer memory 6325, an ECC circuit 6322, a host interface 6324, and a memory interface 6326, for example, a nonvolatile memory interface.

The buffer memory 6325 may temporarily store data provided from a host 6310 or data provided from the plurality of flash memories NVMs included in the memory device 6340. Further, the buffer memory 6325 may temporarily store meta data of the plurality of nonvolatile memories NVMs, for example, map data including a mapping table. The buffer memory 6325 may include any of a variety of volatile memories, such as a DRAM, a SDRAM, a DDR SDRAM, a LPDDR SDRAM, and a GRAM, or nonvolatile memories, such as a FRAM, a ReRAM, a STT-MRAM, and a PRAM. FIG. 10 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels CH1 to CHi.

Furthermore, a plurality of SSDs 6300 to which the memory system 110 of FIG. 1 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information, of the write command provided from the host 6310 in the SSDs 6300, and output data corresponding to the write command to the selected SSDs 6300. Furthermore, when the RAID controller performs a read operation in response to a read command provided from the host 6310, the RAID controller may select one or more memory systems or SSDs 6300 according to a plurality of RAID levels, that is, RAID level information, of the read command provided from the host 6310 in the SSDs 6300, and provide data read from the selected SSDs 6300 to the host 6310.

Figure 11:
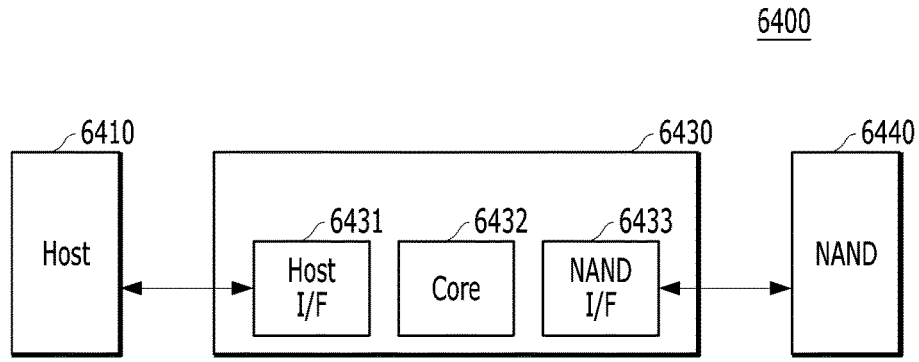

FIG. 11 is a diagram schematically illustrating another example of the data processing system including the memory system shown in FIG. 1 in accordance with an embodiment. FIG. 11 schematically illustrates an embedded Multi-Media Card (eMMC) 6400 to which the memory system of FIG. 1 may be applied.

Referring to FIG. 11, the eMMC 6400 may include a controller 6430 and a memory device 6440 including one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431, and a memory interface 6433, for example, a NAND interface.

The core 6432 may control overall operations of the eMMC 6400, the host interface 6431 may provide an interface function between the controller 6430 and a host 6410, and the NAND interface 6433 may provide an interface function between the memory device 6440 and the controller 6430. For example, the host interface 6431 may serve as a parallel interface, for example, an MMC interface, as described with reference to FIG. 1. Furthermore, the host interface 6431 may serve as a serial interface, for example, UHS ((Ultra High Speed)-I/UHS-II) interface.

FIGS. 12 to 15 are diagrams schematically illustrating other examples of the data processing system including the memory system shown in FIG. 1 in accordance with embodiments. FIGS. 12 to 15 schematically illustrate UFS (Universal Flash Storage) systems to which the memory system of FIG. 1 may be applied.

Referring to FIGS. 12 to 15, UFS systems 6500, 6600, 6700, and 6800 may include hosts 6510, 6610, 6710, and 6810, UFS devices 6520, 6620, 6720, and 6820, and UFS cards 6530, 6630, 6730, and 6830, respectively. The hosts 6510, 6610, 6710, and 6810 may serve as application processors of wired/wireless electronic devices or particularly of mobile electronic devices, the UFS devices 6520, 6620, 6720, and 6820 may serve as embedded UFS devices, and the UFS cards 6530, 6630, 6730, and 6830 may serve as external embedded UFS devices or removable UFS cards.

The hosts 6510, 6610, 6710, and 6810, the UFS devices 6520, 6620, 6720, and 6820, and the UFS cards 6530, 6630, 6730, and 6830 in the respective UFS systems 6500, 6600, 6700, and 6800 may communicate with external devices, for example, wired/wireless electronic devices or particularly mobile electronic devices, through UFS protocols. The UFS devices 6520, 6620, 6720, and 6820 and the UFS cards 6530, 6630, 6730, and 6830 each may include the memory system 110 illustrated in FIG. 1. For example, in the UFS systems 6500, 6600, 6700, and 6800, the UFS devices 6520, 6620, 6720, and 6820 may be embodied in the form of the data processing system 6200, the SSD 6300, or the eMMC 6400 described with reference to FIGS. 9 to 11, respectively, and the UFS cards 6530, 6630, 6730, and 6830 may be embodied in the form of the memory card system 6100 described with reference to FIG. 8.

Furthermore, in the UFS systems 6500, 6600, 6700, and 6800, the hosts 6510, 6610, 6710, and 6810, the UFS devices 6520, 6620, 6720, and 6820 and the UFS cards 6530, 6630, 6730, and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, and 6820 and the UFS cards 6530, 6630, 6730, and 6830 may communicate with each other through any of various protocols other than the UFS protocol, for example, an UFD, a MMC, a SD, a mini-SD, and a micro-SD.

Figure 12:
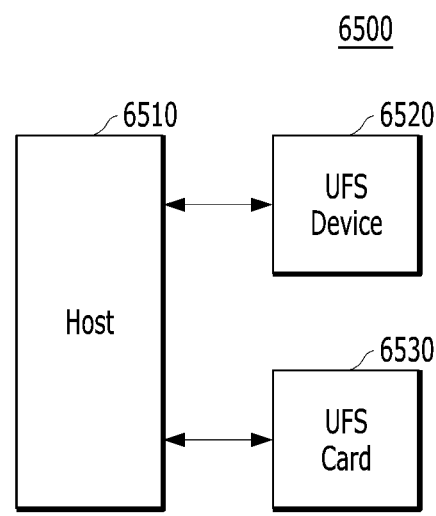

In the UFS system 6500 illustrated in FIG. 12, each of the host 6510, the UFS device 6520, and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through the link layer switching at the UniPro of the host 6510. In the illustrated embodiment, one UFS device 6520 and one UFS card 6530 are connected to the host 6510. However, a plurality of UFS devices and a plurality of UFS cards may be connected in parallel or in the form of a star to the host 6510. A star formation is an arrangement in which a single device is coupled with plural devices for a centralized operation. A plurality of UFS cards may be connected in parallel or in the form of a star to the UFS device 6520 or connected in series or in the form of a chain to the UFS device 6520.

Figure 13:
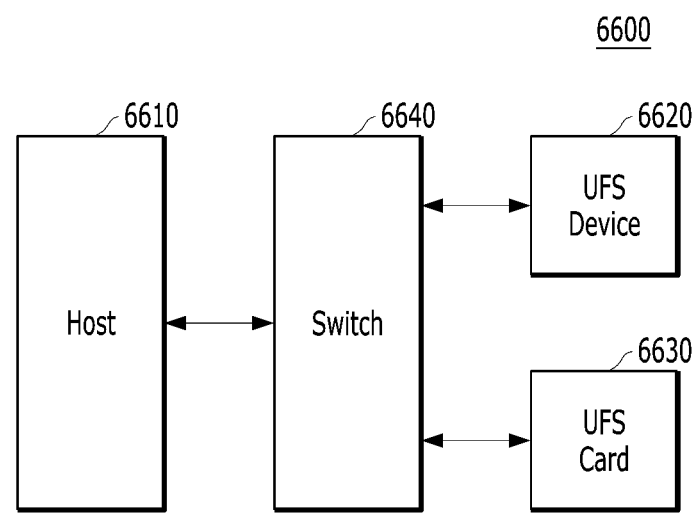

In the UFS system 6600 illustrated in FIG. 13, each of the host 6610, the UFS device 6620, and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through the link layer switching of the switching module 6640 at the UniPro. In the illustrated embodiment, one UFS device 6620 and one UFS card 6630 are connected to the switching module 6640. However, a plurality of UFS devices and a plurality of UFS cards may be connected in parallel or in the form of a star to the switching module 6640. A plurality of UFS cards may be connected in series or in the form of a chain to the UFS device 6620.

Figure 14:
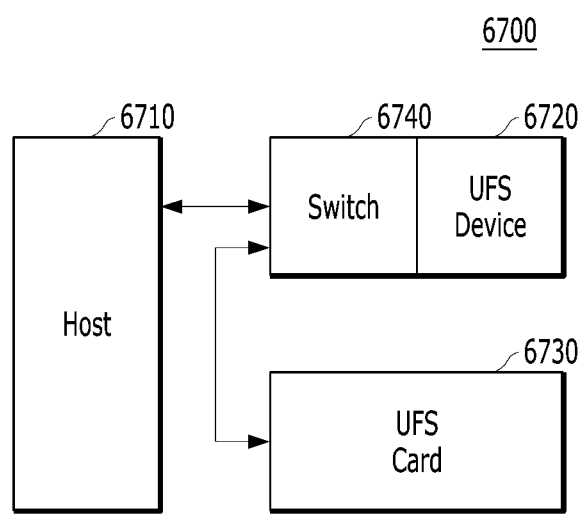

In the UFS system 6700 illustrated in FIG. 14, each of the host 6710, the UFS device 6720, and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through the link layer switching of the switching module 6740 at the UniPro. The switching module 6740 may be integrated as one module with the UFS device 6720, and disposed inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 15:
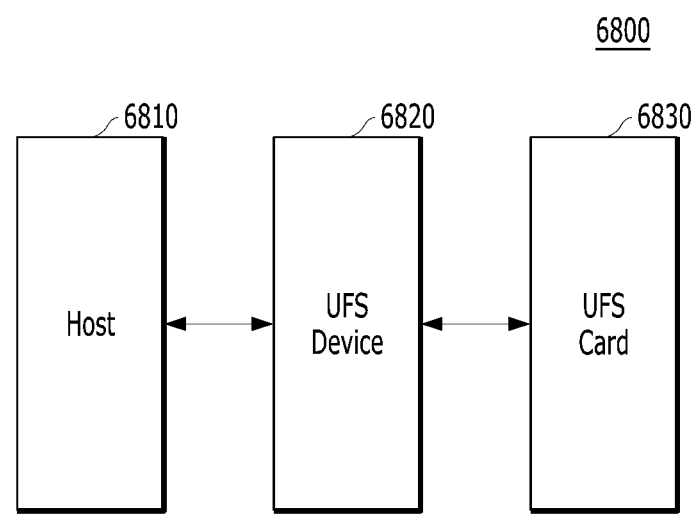

In the UFS system 6800 illustrated in FIG. 15, each of the host 6810, the UFS device 6820, and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through the target ID switching between the M-PHY and UniPro modules of the UFS device 6820. In the illustrated embodiment, one UFS device 6820 is connected to the host 6810, and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 16:
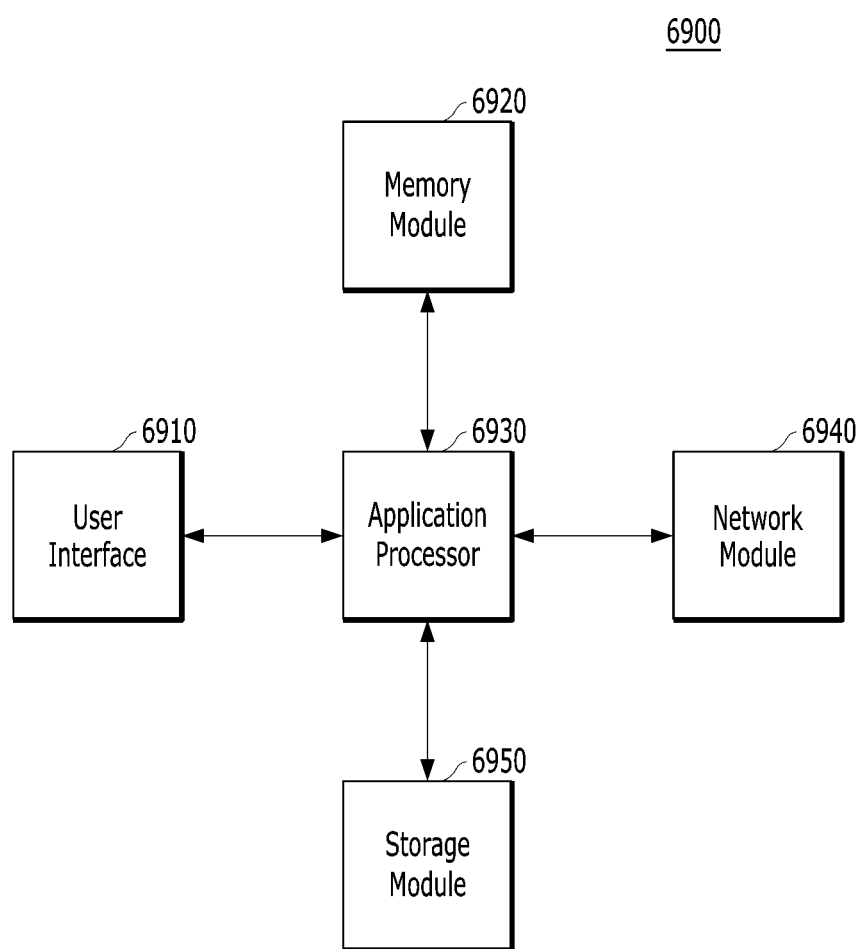

FIG. 16 is a diagram schematically illustrating another example of the data processing system including the memory system shown in FIG. 1 in accordance with an embodiment of the present invention. FIG. 16 is a diagram schematically illustrating a user system 6900 to which the memory system of FIG. 1 may be applied.

Referring to FIG. 16, the user system 6900 may include an application processor 6930, a memory module 6920, a network module 6940, a storage module 6950, and a user interface 6910.

More specifically, the application processor 6930 may drive components in the user system 6900, for example, an OS, and include controllers, interfaces, and a graphic engine which control the components included in the user system 6900. The application processor 6930 may be provided as System-on-Chip (SoC).

The memory module 6920 may be used as a main memory, a work memory, a buffer memory, or a cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LDDDR2 SDRAM, or a LPDDR3 SDRAM, or a nonvolatile RAM such as a PRAM, a ReRAM, a MRAM, or a FRAM. For example, the application processor 6930 and the memory module 6920 may be packaged and mounted based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), or the like, thereby communicating with wired/wireless electronic devices, e.g., mobile electronic devices. Therefore, the memory system and the data processing system, in accordance with an embodiment of the present disclosure, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash, a 3D NAND flash, or the like, and provided as a removable storage medium such as a memory card or external drive of the user system 6900. The storage module 6950 may correspond to the memory system 110 described above with reference to FIG. 1. Furthermore, the storage module 6950 may be embodied as an SSD, an eMMC, or an UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor, a piezoelectric element, or the like, and user output interfaces such as a liquid crystal display (LCD), an organic light emitting diode (OLED) display device, an active matrix OLED (AMOLED) display device, an LED, a speaker, a motor, or the like.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the application processor 6930 on a display/touch module of the mobile electronic device, or support a function of receiving data from the touch panel.

The data processing system in accordance with the embodiments can efficiently perform a background operation using the integrated memory of the host.

While the present invention has been described with respect to the specific embodiments, it will be apparent to those skilled in the art that various changes and modifications may be made without departing from the spirit and scope of the invention as defined in the following claims.

What is claimed is:

1. A method for performing a background operation in a data processing system, the method comprising:
   selecting a sacrificial memory block from a plurality of memory blocks provided in a memory device;
   transferring current valid data stored in the selected sacrificial memory block to a first memory in a host when an available capacity of the first memory is larger than or equal to a size of the current valid data;
   loading target data from the first memory to a second memory in a controller when the available capacity of the first memory is smaller than the size of the current valid data, the target data being valid data that has been read from a previously selected sacrificial memory block in the memory device and stored in the first memory; and
   storing the target data in at least one target memory block in the memory device.

2. The method of claim 1, wherein the first memory is an integrated memory in the host, the method further comprising:
   loading the current valid data to the second memory in the controller when transferring the current valid data to the first memory of the host.

3. The method of claim 1, further comprising:
   deleting the target data from the first memory after the target data is loaded to the second memory; and
   storing the current valid data in the first memory.

4. The method of claim 1, further comprising: arranging the target data according to a predetermined criterion before storing the target data in the at least one target memory block of the memory device.

5. The method of claim 4, wherein the target data is arranged according to an order of a logical address corresponding to the target data.

6. The method of claim 4, wherein the target data is sorted according to whether the target data is hot data or cold data, the hot data being first target data and the cold data being second target data.

7. The method of claim 6, wherein the first target data and the second target data are stored in different target memory blocks, and wherein the background operation is a garbage collection operation.

8. The method of claim 1, further comprising:
storing and updating information on the available capacity of the first memory in the second memory when the available capacity of the first memory is changed.

9. A data processing system, comprising:
a host including a first memory; and
a memory system including a memory device and a controller, wherein, in order to perform a background operation, the memory system is configured to:
select a sacrificial memory block from a plurality of memory blocks provided in the memory device;
transfer current valid data stored in the selected sacrificial memory block to the first memory in the host when an available capacity of the first memory is larger than or equal to a size of the current valid data;
load target data stored in the first memory to a second memory in the controller when the available capacity of the first memory is smaller than the size of the current valid data, the target data being valid data that has been read from a previously selected sacrificial memory block in the memory device and stored in the first memory; and
store the target data in at least one target memory block in the memory device.

10. The data processing system of claim 9, wherein the first memory is an integrated memory in the host.

11. The data processing system of claim 10, wherein the memory system is further configured to:
load the current valid data to the second memory in the controller when transferring the current valid data to the first memory of the host.

12. The data processing system of claim 9, wherein the host is configured to delete the target data from the first memory after the target data is loaded to the second memory, and store the current valid data in the first memory.

13. The data processing system of claim 9, wherein the memory system is further configured to arrange the target data according to a predetermined criterion before storing the target data in the at least one target memory block.

14. The data processing system of claim 9, wherein the host is further configured to:
provide information on the available capacity of the first memory to the controller when the available capacity of the first memory is changed,
wherein the second memory stores and updates the information on the available capacity of the first memory.

15. A memory system, comprising:
a memory device including a sacrificial memory block and at least one target memory block; and
a controller coupled to the memory device and having a first memory, the controller configured to:
load current valid data stored in the sacrificial memory block in the first memory, and transfer the current valid data to a host when the available capacity of a second memory of the host is larger than or equal to a size of the current valid data;
load target data stored in the second memory to the first memory when the available capacity of the second memory is smaller than the size of the current valid data, the target data being valid data that has been read from a previously selected sacrificial memory block in the memory device and stored in the second memory; and
store the target data in the at least one target memory block in the memory device.

16. The memory system of claim 15, wherein the controller is further configured to arrange the target data according to a predetermined criterion before storing the target data in the at least one target memory block.

17. The memory system of claim 16, wherein the target data is arranged according to an order of a logical address corresponding to the target data, or according to whether the target data is hot data or cold data.

* * * * *